(12) United States Patent
Stolle

(10) Patent No.: US 12,214,882 B2
(45) Date of Patent: Feb. 4, 2025

(54) LAVATORY DOOR SYSTEM FOR A VEHICLE

(71) Applicant: Airbus Operations GmbH, Hamburg (DE)

(72) Inventor: Christian Stolle, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 108 days.

(21) Appl. No.: 18/299,153

(22) Filed: Apr. 12, 2023

(65) Prior Publication Data

US 2023/0332454 A1    Oct. 19, 2023

(30) Foreign Application Priority Data

Apr. 14, 2022   (EP) ..................................... 22168375

(51) Int. Cl.

| | |
|---|---|
| *B64D 11/02* | (2006.01) |
| *B64C 1/14* | (2006.01) |
| *E05B 81/78* | (2014.01) |
| *E05B 83/00* | (2014.01) |
| *E05F 15/51* | (2015.01) |
| *E05F 15/73* | (2015.01) |
| *E05B 81/70* | (2014.01) |

(52) U.S. Cl.
CPC ............ *B64D 11/02* (2013.01); *B64C 1/1407* (2013.01); *E05B 81/78* (2013.01); *E05B 83/00* (2013.01); *E05F 15/51* (2015.01); *E05F 15/73* (2015.01); *E05B 81/70* (2013.01); *E05Y 2900/502* (2013.01)

(58) Field of Classification Search
CPC ....... B64C 1/1407; B64D 11/02; E05B 81/78; E05B 81/70; E05B 83/00; E05F 15/73; E05F 15/51; E03D 11/12; E03F 1/006; E05Y 2900/502
See application file for complete search history.

(56) References Cited

U.S. PATENT DOCUMENTS

| | | | |
|---|---|---|---|
| 10,017,968 B2 | 7/2018 | Seibt et al. | |
| 2010/0116935 A1* | 5/2010 | Rieger | B64D 11/02 4/431 |

(Continued)

FOREIGN PATENT DOCUMENTS

| | | |
|---|---|---|
| EP | 2495381 A1 | 9/2012 |
| EP | 2933184 A1 | 10/2015 |

(Continued)

OTHER PUBLICATIONS

European Search Report for European Patent Application No. 22168375 dated Sep. 16, 2022; priority document.

*Primary Examiner* — Justin B Rephann
(74) *Attorney, Agent, or Firm* — Greer, Burns & Crain, Ltd.

(57) ABSTRACT

A lavatory door system for a vehicle, in particular an aircraft, with a lavatory door; a pneumatic actuator configured to open and close the lavatory door based on a differential pressure, wherein the pneumatic actuator is coupled to a vacuum toilet system of the vehicle to generate the differential pressure; and an operating interface configured to receive a user control operation and to selectively release the differential pressure from the vacuum toilet system for operation of the pneumatic actuator based on the received user control operation.

15 Claims, 1 Drawing Sheet

(56) References Cited

U.S. PATENT DOCUMENTS

| | | | |
|---|---|---|---|
| 2015/0300054 A1 | 10/2015 | Seibt et al. | |
| 2017/0283062 A1* | 10/2017 | Childress | B08B 5/04 |
| 2017/0284076 A1* | 10/2017 | Jensen | E03D 9/002 |
| 2018/0143213 A1 | 5/2018 | Schomburg et al. | |
| 2020/0102078 A1* | 4/2020 | Gnos | E03F 1/006 |
| 2021/0363798 A1 | 11/2021 | Subramanian et al. | |
| 2022/0042365 A1 | 2/2022 | Sripathi et al. | |
| 2022/0179499 A1 | 6/2022 | Behlau et al. | |
| 2023/0271705 A1* | 8/2023 | Gnos | E03F 1/006 |
| | | | 244/118.5 |
| 2023/0272646 A1* | 8/2023 | Müller | E05B 83/00 |
| | | | 244/129.5 |

FOREIGN PATENT DOCUMENTS

| | | |
|---|---|---|
| EP | 3916177 A1 | 12/2021 |
| EP | 3940510 A2 | 1/2022 |
| WO | 2016097400 A1 | 6/2016 |
| WO | 2020259968 A1 | 12/2020 |

* cited by examiner

LAVATORY DOOR SYSTEM FOR A VEHICLE

CROSS-REFERENCES TO RELATED APPLICATIONS

This application claims the benefit of European Patent Application No. 22168375-8 filed on Apr. 14, 2022, the entire disclosure of which is incorporated herein by way of reference.

FIELD OF THE INVENTION

The present invention pertains to a lavatory door system for a vehicle, in particular an aircraft.

BACKGROUND OF THE INVENTION

Although it can be used in many applications, the present invention and the problems underlying it are explained in greater detail in relation to passenger aircraft. However, the methods and devices described can likewise be used in different vehicles and in all sectors of the transport industry, e.g. for road vehicles, for rail vehicles, for watercraft or for general aircraft.

In public transport vehicles, e.g. in passenger aircraft, lavatory doors are usually operated either manually or be means of actuators and elements like buttons or the like that are to be actuated by a passenger by finger or palm pressure, for example. Due to the direct contact of the doors and/or their actuating devices with the fingers or hands of passengers, bacteria and other pathogens can easily be transferred from one passenger to another. In order to reduce pathogen transmission, disinfectant dispensers are used in some public passenger vehicles, especially in their sanitary rooms, by means of which passengers can disinfect their hands. However, it would be beneficial if the risk of pathogen transmission could be further reduced.

Automatic doors are often used where a contamination of the users or the load to operate the door shall be avoided. Sometimes automatic doors are also introduced as comfort items in case heavy and/or bulky components are to be moved through the respective door. Usually, such automatic doors are actuated by electrically driven actuators that may require considerable amounts of electric energy.

WO 2020/259968 A1 describes an actuating device for a vehicle used in public transport, e.g. a train, for activating a door drive to open or close a vehicle door or to flush a toilet, wherein the transmission of pathogens from one person to another person during the actuation of the actuation device is avoided by utilizing a predefined contactless actuation hand gesture.

Against this background, it is an object of the present invention to find comfortable and yet energy-saving solutions for operating doors within vehicles.

SUMMARY OF THE INVENTION

This object may be achieved by a lavatory door system having the features of one or more embodiments described herein, as well as by an aircraft having the features of one or more embodiments described herein.

According to the invention, a lavatory door system for a vehicle, in particular an aircraft, comprises a lavatory door; a pneumatic actuator configured to open and close the lavatory door based on a differential pressure, wherein the pneumatic actuator is configured to be coupled to a vacuum toilet system of the vehicle to generate the differential pressure; and an operating interface configured to receive a user control operation and to selectively release the differential pressure from the vacuum toilet system for operation of the pneumatic actuator based on the received user control operation.

Further according to the invention, an aircraft comprises a lavatory door system according to the invention.

Thus, some aspects of the present invention do not rely on electric power as primary energy source and instead use the pressure delivered by the vacuum toilet system in combination with a pneumatic actuator to actuate the doors of a lavatory. In this vein, consumption of electric power can be kept low without having to compromise on convenience. When pressurized, the actuator may apply a torque on the door axis in either direction to close and open the door, respectively. The specific torque may be kept within a predefined interval while the actuator is travelling. For example, the actuator may generate a force that is roughly constant along the travelling path of the door (and/or the door wings/folds). The force of the actuator can be chosen in relation to the friction such that the door moves relatively quickly, yet still does not accelerate too much and can be caught smoothly at respective end positions. The presently followed mechanism allows a manual override of the actuation so that the door may be forced open at any position and in both directions in case of emergency, e.g. under loss of supply pressure, which means that there is no mechanical decoupling necessary as in case of electric solutions.

Advantageous embodiments and improvements of the present invention are found in the subordinate claims.

According to an embodiment of the invention, the operating interface may be configured to be operated by foot.

The operating interface, which generally functions as a human machine interface in the invention, is thus operated by foot in this embodiment, i.e. the hands are not required to open and close the door. The embodiment is robust and offers a working solution with minimal complexity. It also meets stricter sanitary requirements as it no longer requires the user to touch any surface or operating element by hand in order to close and open the door, especially if in addition a hands-free device is optionally used for locking/unlocking the door (e.g. by using an elbow handle, a foot pedal etc.).

The operating interface may comprise a foot pedal, push button, lever or any other suitable operating element that can be operated by foot. The operating element may be mechanically coupled with a mechanical valve for selectively releasing the differential pressure from the vacuum toilet system to the pneumatic actuator, which can be, for example, a pneumatic motor. A certain displacement or adjustment of the operating element may then translate into a respective valve setting corresponding to a certain movement of the lavatory door.

According to an embodiment of the invention, the operating interface may be configured as a foot pedal.

The foot pedal may, for example, be integrated in a floor and/or a lavatory wall, e.g. with interfaces inside and/or outside a lavatory cubicle. Hence, there may a single foot pedal that can be operated from inside as well outside the lavatory. The person of skill however will readily conceive equivalent solutions based on push buttons or other elements that can be integrated in a floor and/or a lower portion of a wall and that can be pushed and/or pressed by using the foot. Moreover, alternative embodiments may comprise more than one foot pedal, e.g. one foot pedal inside the lavatory and one outside of it.

According to an embodiment of the invention, the operating interface may be configured to indicate activation by an operating position, a visual indication signal and/or an indication sound.

For example, a foot pedal may indicate the activation by the pedal position, a subdued light effect at the pedal and/or by a clicking noise.

According to an embodiment of the invention, the operating interface may be configured as an electronic interface to be operated contactless. The system may then further comprise an electrical actuation valve to selectively release the differential pressure for the pneumatic actuator and a control unit configured to operate the electrical actuation valve based on the user control operation received by the operating interface.

This embodiment thus may extend a purely mechanical solution to an automatic door system, wherein, for example, a foot pedal valve may be replaced by and/or be supplemented by an electrically driven valve, e.g. a solenoid valve, which then may be integrated in a microcontroller-controlled architecture. The control unit serves as the central unit to control and monitor the whole assembly/arrangement. It may distribute the electrical power and signals to the parts and may further monitor user inputs and a door status. For example, it may control electrical power for a solenoid valve to enable opening and closing of the door.

For example, the operating interface may comprise a motion sensor and/or a camera to identify the approach of a user and/or certain movements of a user in front of the lavatory door inside and/or outside the lavatory. The movement of the user may then by analyzed by the system. If the detected movement fulfills certain predefined requirements, the system may then automatically activate the valve and release the differential pressure, thereby operating the pneumatic actuator and opening or closing the lavatory door. To this end, the operating interface may be installed at a suitable height at or close to the lavatory door.

For example, automatic opening of the lavatory door may already be provoked in case a user approaches the closed lavatory door under a certain minimal distance. Additionally, or alternatively, the user may be required to perform a certain gesture in front of the door, e.g. in front of a display serving as a human machine interface.

According to an embodiment of the invention, the operating interface may be configured to detect a movement of a user, in particular a first hand gesture, and to determine the user control operation based on the detected movement of the user.

According to an embodiment of the invention, the first hand gesture may comprise a hand gesture upwards for opening the lavatory door and a hand gesture downwards for closing the lavatory door.

For example, a user may approach the lavatory door, which may have a display as human machine interface installed at a suitable height to allow usage by children and also passengers with handicaps. The door may be closed and the display may display green to indicate that the lavatory is free and may furthermore display instructions for usage of the lavatory. A gesture sensor is expecting an input and the actuator may not be pressurized. A gesture (e.g. upwards) in front of the door and/or the display may then trigger activation of the actuator. The door then opens and the passenger may enter the lavatory. A display inside may indicate corresponding instructions for closing the door with a gesture (e.g. downwards). The door thus may close after a gesture downwards and can then either be locked manually or with a different hand gesture, e.g. a horizontal gesture.

According to an embodiment of the invention, the operating interface may comprise a display configured to display user instructions, a lavatory door status and/or feedback information on the received user control operation.

One or several displays may thus serve as the actual human machine interface of the operating interface. A first such display may be arranged within the lavatory and another may be positioned outside the lavatory. Each display may comprise touchless activation control (e.g. by distance and/or by gesture control). They may show instructions and/or give feedback on a lavatory and/or door status (e.g. color code red=occupied or locked/green=vacant or unlocked), as well as feedback to a user request/control operation (e.g. detected/completed blue=welcome).

According to an embodiment of the invention, the system may further comprise an actuated door lock controlled by the control unit and configured to selectively adapt a locking status of the lavatory door based on a user control operation received by the operating interface. The operating interface may be configured to determine the user control operation based on a detected movement of the user, in particular a second hand gesture.

The actuated door lock follows the controls and the user input on the human machine interface, e.g. a display unit, for door locking when the door is closed (e.g. with an horizontal waving to simulate a slider). After recognition of the movement, an included actuator (e.g. a servo motor) may drive the lock shut or into an open position.

According to an embodiment of the invention, the second hand gesture may comprise a horizontal hand gesture for locking the lavatory door and a reversed horizontal hand gesture for unlocking the lavatory door.

Thus, with a horizontal gesture, comparable to the manual slide for locking—the usual current design and operation for aircraft doors for example—the lavatory may get closed, e.g. by means of a hand gesture to the right. A display may then display red to indicate that the lavatory is occupied and the door is closed.

To leave the lavatory, a horizontal gesture corresponding to a slider may be carried out—e.g. to the left—and the display may then change/return to green. The door may then be opened with a vertical upwards gesture. Outside the lavatory, the door may be closed again with a gesture downwards of the hand and/or may be automatically closed after a time, which sets then the lavatory door back into the initial state for the next user.

According to an embodiment of the invention, the system may further comprise a door position sensor communicatively coupled to the control unit and configured to monitor a closing status of the lavatory door. The control unit may be configured to set the locking status of the actuated door lock based on the closing status of the lavatory door.

In this embodiment, a door sensor is installed for monitoring the door position to avoid incorrect actuation of the door. Such a sensor may allow the control unit to move the lock once an end position of the door is reached. The sensor also may provide the possibility to introduce a plausibility check for commanded door position and actual door position. The control unit may then switch off power at the electronically driven valve in case this is not needed (power saving function). The control unit may also trigger a fault status, if the default door close position cannot be reached, which may then be indicated on a display accordingly.

According to an embodiment of the invention, the pneumatic actuator may be coupled to the vacuum toilet system by a supply line. The supply line may comprise a separator and/or a check valve.

The actuator may be supplied with differential pressure by vacuum lines to a mechanical valve (e.g. operated by a foot pedal) or an electrically driven valve (e.g. a solenoid valve). The respective valve may then be connected to an existing vacuum toilet system. To avoid clogging of the lines a separator may be installed, as pressure gradients could result in a backflow into the supply lines even if the nominal flow direction is towards the vacuum system. The separator here may collects particles and/or fluids that could otherwise be transported back to the door equipment in such a case. To further reduce this effect, a supplemental check valve may be installed, so that the line is shut fast in case of such a flow direction. An additional shut-off valve (e.g. in series to the check valve) could be introduced, which then would enable segregation of the parts in case of leakages and would allow exchange of parts while the vacuum system is engaged, e.g. for maintenance.

According to an embodiment of the invention, the pneumatic actuator may comprise adjustable end stops and dampers to define target positions of the lavatory door in an open state and in a closed state.

The door is connected to the pneumatic actuator, e.g. by a rotary actuator for generating a torque on one or several door wings/folds. The actuator may include adjustable end stops and dampers such that it may rotate the door quickly to gain fast lavatory access when pressure is applied to its connections creating a differential pressure, yet at the same time stop in a controlled fashion at the predefined target positions. This may be supplemented by a feature which allows over-pushing the door wings/folds to hold and open the doors manually at any position and in both directions in cases of emergency and/or failure, e.g. under loss of supply pressure.

According to an embodiment of the invention, the lavatory door may be a bi-fold door, of which each fold may be actuated by the pneumatic actuator.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION OF THE PREFERRED EMBODIMENTS

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
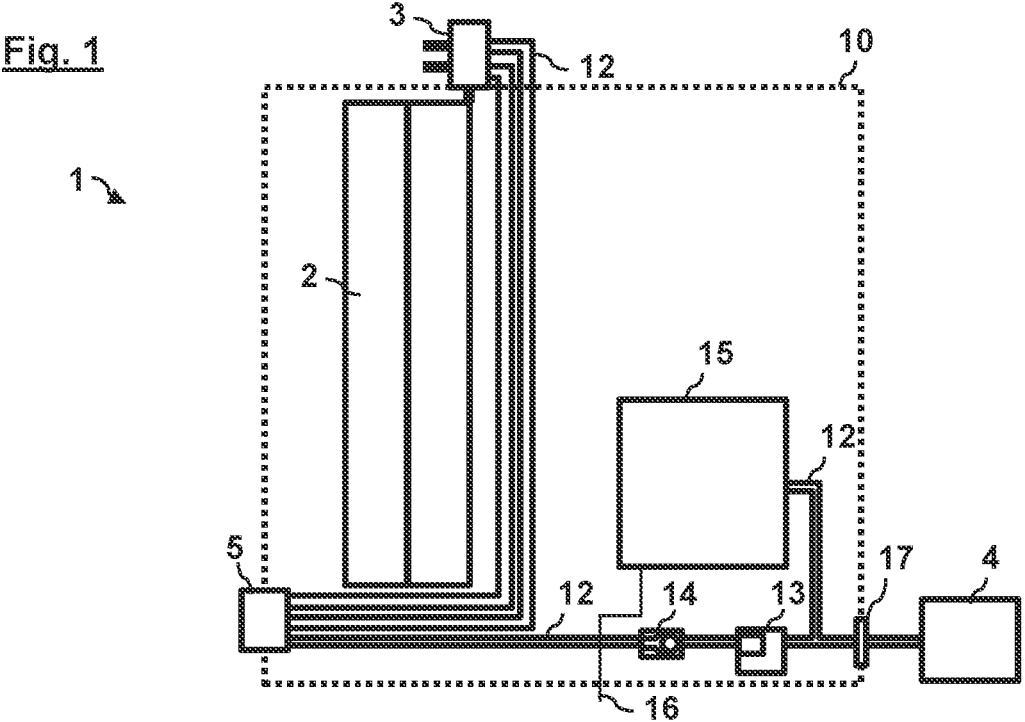
FIG. 1 schematically depicts a lavatory door system according to an embodiment of the invention.
Figure 2:
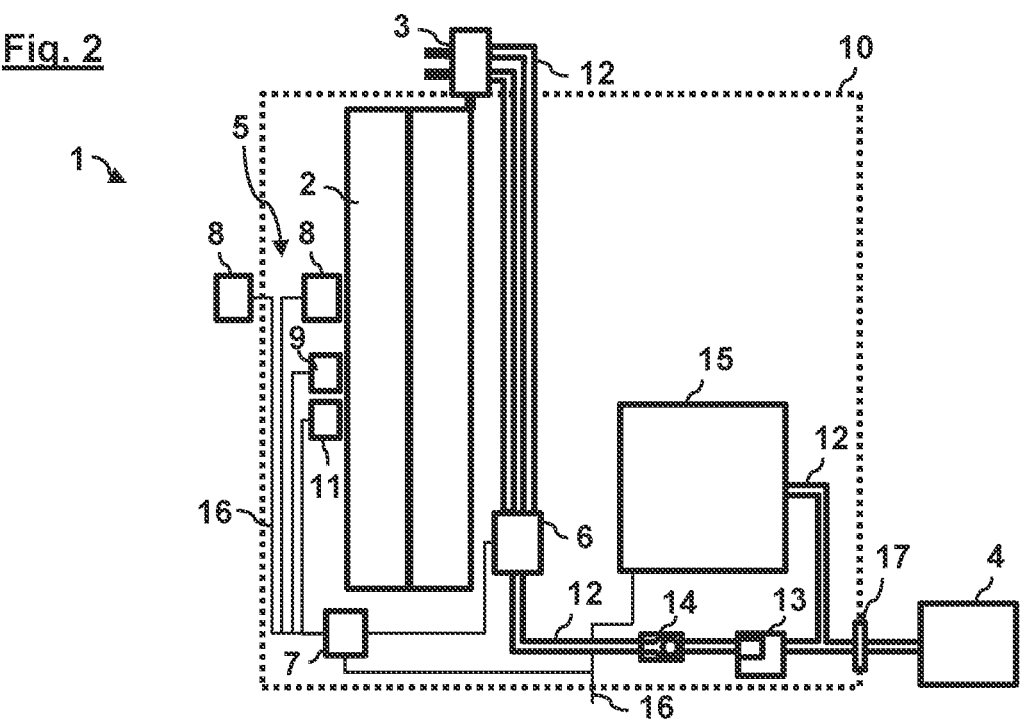
FIG. 2 schematically depicts a lavatory door system according to another embodiment of the invention.
Figure 3:
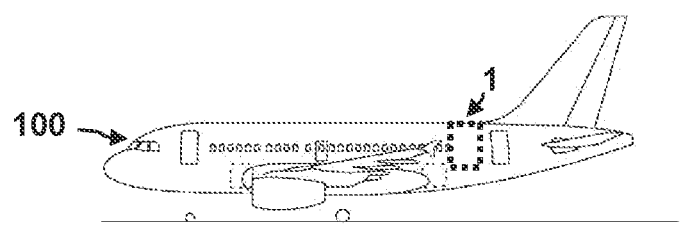
FIG. 3 schematically depicts an aircraft equipped with one of the lavatory door systems of FIGS. 1 and 2.

FIG. 1 schematically depicts a lavatory door system 1 according to an embodiment of the invention. FIG. 2 schematically depicts a lavatory door system 1 according to another embodiment of the invention. The lavatory door system 1 may be used, for example, in a lavatory 10 of a passenger aircraft 100 as it is exemplarily depicted in FIG. 3.

FIGS. 1 and 2 are exemplifying two different embodiments for operating (opening/closing) a lavatory door 2 in a basically contactless manner (that is, without having to touch any surface of the door 2 and/or its operating elements by hand): a solution operated by foot (FIG. 1) and an automatic solution based on contactless hand gesture recognition (FIG. 2). Both embodiments rely on differential pressure for actuation of the door 2, which is provided by a vacuum toilet system 4 of the lavatory 10. Hence, even the automatic solution can be provided with low consumption of electric energy.

Each lavatory door system 1 comprises a lavatory door 2, e.g. a bifold door having two identical folds adapted to swing into an interior space of the lavatory 10. Moreover, the systems 1 comprise a pneumatic actuator 3 configured to open and close the lavatory door 2 based on a differential pressure, the pneumatic actuator 3 being configured to be coupled to the vacuum toilet system 4 of the aircraft 100 to generate the differential pressure. Moreover, an operating interface 5 is provided as human machine interface that is configured to receive a user control operation and to selectively release the differential pressure from the vacuum toilet system 4 for operation of the pneumatic actuator 3 based on the received user control operation.

The pneumatic actuator 3 may be coupled to the vacuum toilet system 4 by a supply line 12 via a vacuum interface connector 17, which also supplies a vacuum toilet unit 15 of the lavatory 10 with differential pressure. The supply line 12 of these embodiments moreover comprises a separator 13 and a check valve 14 to make sure that no backflow of material is possible from the vacuum system 4 into the door system.

The pneumatic actuator 3 may be a pneumatic motor that actuates both folds of the lavatory door 2 equally. To reach well-defined target positions of the lavatory door 2 in an open state and in a closed state in a smooth manner, the pneumatic actuator 3 may comprise adjustable end stops and dampers. The door folds may be moved relatively quickly by the actuator 3 to gain fast lavatory access. Nevertheless, due to the pneumatic approach, actuation may be easy even in case of the mechanical solution of FIG. 1, as well as basically soundless. When pressurized, the actuator 3 may apply a certain spring force when it is travelling without accumulation of a spring load over the whole path. The friction of the actuator 3 and the door 2 may come beneficial in this regard to keep the assembly from accelerating too much (this may be supported by the dampers at the target positions to avoid slamming of the door). The actuator 3 may be constructed to allow manual opening (and closing) of the door even in cases of emergency or failure, e.g. in case of pressure and/or power loss.

In the embodiment of FIG. 1, the operating interface 5 is configured as a foot pedal to be operated mechanically by foot. Such a pedal may be provided in a wall of the lavatory 10 with interfaces inside and outside the lavatory 10 for opening and closing the door 2 from both sides. The foot pedal valve may indicate its activation by the pedal position, a visual light indication and/or by a clicking noise or the like.

When pressurized, the actuator 3 applies in either direction a torque to the door folds according to a foot pedal valve actuation sequence. The torque may remain within certain predefined limitations while the actuator is travelling.

The door 2 may be locked manually as in conventional systems, which means that usage of the lavatory 2 may still require manual steps. However, movement of the door is possible without usage of the hands. The system 1 of this embodiment is very robust and simple in construction.

In the embodiment of FIG. 2 on the other hand, a fully automatic and contactless version of the invention is provided, which is nevertheless energy saving due to the reliance on pneumatic pressure from the vacuum toilet system 4.

In this case, the operating interface 5 is configured as an electronic interface to be operated contactless. To this end, the operating interface 5 is configured to detect a movement of a user, in particular a first hand gesture, and to determine the user control operation based on the detected movement of the user. The system 1 further comprises an electrical actuation valve 6 to selectively release the differential pressure for the pneumatic actuator 3 and a control unit 7 configured to operate the electrical actuation valve 6 based on the user control operation received by the operating interface 3. The actual human machine interface is provided by two displays 8, one inside and one outside the lavatory 10 close to and/or at the door 2. Each display 8 is configured to display various information comprising amongst others, for example, user instructions, a lavatory door status and feedback information on the received user control operation.

The system 1 of FIG. 2 further comprises an actuated door lock 9 controlled by the control unit 7 and configured to selectively adapt a locking status of the lavatory door 2 based on a user control operation received by the operating interface 5, which is also determined by the control unit 7 based on a detected movement of the user, which may be, for example, a second hand gesture. The door lock 9 is supplemented by a door position sensor 11 communicatively coupled to the control unit 7 and configured to monitor a closing status of the lavatory door 2, which is considered by the control unit 7 for setting the locking status of the actuated door lock 9. Information from the sensor 11 can be used, for example, to make sure that the door 2 is correctly closed before it gets locked.

To give an example: the first hand gesture may comprise a hand gesture upwards for opening the lavatory door 2 and a hand gesture downwards for closing the lavatory door 2. The second hand gesture on the other hand may comprise a horizontal hand gesture for locking the lavatory door 2 (e.g. sliding/sweeping movement to the left) and a reversed horizontal hand gesture for unlocking the lavatory door 2 (e.g. sliding/sweeping movement to the right). The displays 8 may show corresponding and changing information depending on the current status of the door 2 and lavatory 10 (e.g. blue sign for availability of the lavatory, green/red for unlocked/locked door 2).

The lavatory 10 of this embodiment can thus be entered and left as well as locked and unlocked without having to touch any surfaces or elements of the lavatory 10. Hence, this embodiment provides significant advantages from a sanitary point of view, while still keeping energy consumption low due to the reliance on the vacuum system for actuation of the door 2. The handling of the door 2 in this regard including opening and closing as well as locking is very intuitive and simple.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the invention and its practical applications, to thereby enable others skilled in the art to best utilize the invention and various embodiments with various modifications as are suited to the particular use contemplated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A lavatory door system for a vehicle comprising:
   a lavatory door;
   a pneumatic actuator configured to open and close the lavatory door based on a differential pressure, wherein the pneumatic actuator is configured to be coupled to a vacuum toilet system of the vehicle to generate the differential pressure; and
   an operating interface configured to receive a user control operation and to selectively release the differential pressure from the vacuum toilet system for operation of the pneumatic actuator based on the received user control operation.

2. The lavatory door system according claim 1, wherein the operating interface is configured to be operated by foot.

3. The lavatory door system according to claim 2, wherein the operating interface is configured as a foot pedal.

4. The lavatory door system according to claim 2, wherein the operating interface is configured to indicate activation by at least one of an operating position, a visual indication signal, and an indication sound.

5. The lavatory door system according to claim 1, wherein the operating interface is configured as an electronic interface to be operated contactless, the system further comprising:
   an electrical actuation valve to selectively release the differential pressure for the pneumatic actuator; and
   a control unit configured to operate the electrical actuation valve based on the user control operation received by the operating interface.

6. The lavatory door system according to claim 5, wherein the operating interface is configured to detect a movement of a user and to determine the user control operation based on the detected movement of the user.

7. The lavatory door system according to claim 6, wherein the movement of the user comprises a hand gesture, and wherein the hand gesture comprises a first hand gesture upwards for opening the lavatory door and a second hand gesture downwards for closing the lavatory door.

8. The lavatory door system according to claim 5, wherein the operating interface comprises a display configured to display at least one of user instructions, a lavatory door status, and feedback information on the received user control operation.

9. The lavatory door system according to claim 5, further comprising:
   an actuated door lock controlled by the control unit and configured to selectively adapt a locking status of the lavatory door based on a user control operation received by the operating interface,
   wherein the operating interface is configured to determine the user control operation based on a detected movement of the user.

10. The lavatory door system according to claim 9, wherein the detected movement of the user comprises a hand gesture, and wherein the hand gesture comprises a horizontal hand gesture for locking the lavatory door and a reversed horizontal hand gesture for unlocking the lavatory door.

11. The lavatory door system according to claim 9, further comprising:
   a door position sensor communicatively coupled to the control unit and configured to monitor a closing status of the lavatory door, wherein the control unit is configured to set the locking status of the actuated door lock based on the closing status of the lavatory door.

12. The lavatory door system according to claim 1, wherein the pneumatic actuator is coupled to the vacuum toilet system by a supply line, the supply line comprising at least one of a separator and a check valve.

13. The lavatory door system according to claim 1, wherein the pneumatic actuator comprises adjustable end stops and dampers to define target positions of the lavatory door in an open state and in a closed state.

14. The lavatory door system according to claim 1, wherein the lavatory door is a bi-fold door, wherein each fold of the bi-fold door is actuated by the pneumatic actuator.

15. An aircraft having a lavatory door system according to claim 1.

* * * * *